United States Patent
Kattainen et al.

(10) Patent No.: US 9,580,273 B2
(45) Date of Patent: Feb. 28, 2017

(54) TESTING APPARATUS AND SAFETY ARRANGEMENT

(71) Applicants: Ari Kattainen, Hyvinkaa (FI); Antti Hovi, Hyvinkaa (FI)

(72) Inventors: Ari Kattainen, Hyvinkaa (FI); Antti Hovi, Hyvinkaa (FI)

(73) Assignee: Kone Corporation, Helsinki (FI)

(*) Notice: Subject to any disclaimer, the term of this patent is extended or adjusted under 35 U.S.C. 154(b) by 0 days.

(21) Appl. No.: 14/491,252

(22) Filed: Sep. 19, 2014

(65) Prior Publication Data

US 2015/0039258 A1 Feb. 5, 2015

Related U.S. Application Data

(63) Continuation of application No. PCT/FI2013/050370, filed on Apr. 5, 2013.

(30) Foreign Application Priority Data

Apr. 20, 2012 (FI) ...................................... 20125430

(51) Int. Cl.
*B66B 1/48* (2006.01)
*B66B 5/00* (2006.01)
*B65G 43/06* (2006.01)

(52) U.S. Cl.
CPC ................ *B66B 1/48* (2013.01); *B65G 43/06* (2013.01); *B66B 5/00* (2013.01); *B66B 5/0031* (2013.01)

(58) Field of Classification Search
CPC B66B 1/48; B66B 1/3492; B66B 5/00; B66B 5/0031; B66B 5/0087; B66B 5/0006;
(Continued)

(56) References Cited

U.S. PATENT DOCUMENTS 4,088,900 A 5/1978 Klopsch et al.
4,898,263 A 2/1990 Manske et al.
(Continued)

FOREIGN PATENT DOCUMENTS

CN 1481332 A 3/2004
CN 102112384 A 6/2011
(Continued)

OTHER PUBLICATIONS

Chinese Office Action dated Nov. 10, 2015 issued in corresponding Chinese Application No. 201380020804.1.
(Continued)

*Primary Examiner* — Manuel L Barbee
(74) *Attorney, Agent, or Firm* — Harness, Dickey & Pierce (57) ABSTRACT

The invention relates to a safety arrangement and also a testing apparatus for testing the operation of an extreme limit switch in a conveying system, which can be removed from service on the basis of a signal to be received from the extreme limit switch. The testing apparatus comprises a microprocessor and a memory, in which is recorded a testing program to be run with the microprocessor, which testing program comprises instructions for preventing removal of the conveying system from service occurring on the basis of a signal from an extreme limit switch as well as for testing the operation of the extreme limit switch when removal of the conveying system from service has been prevented.

20 Claims, 3 Drawing Sheets (58) Field of Classification Search
CPC ....... B66B 5/02; B66B 5/0018; B66B 5/0025; B66B 5/0037; B66B 5/0093; B66B 13/22; B65G 43/06; B65G 43/00; B65G 43/04; B65G 2812/02099; B65G 2812/02108
See application file for complete search history.

(56) References Cited

U.S. PATENT DOCUMENTS

| | | |
|---|---|---|
| 8,123,003 B2 | 2/2012 | Meri et al. |
| 8,276,716 B2 | 10/2012 | Meri et al. |
| 2010/0141267 A1* | 6/2010 | Quinn .................... B66B 13/22 324/549 |
| 2011/0114425 A1 | 5/2011 | Meri et al. |
| 2012/0031710 A1 | 2/2012 | Meri et al. |

FOREIGN PATENT DOCUMENTS

| | | | |
|---|---|---|---|
| CN | 102227367 A | | 10/2011 |
| JP | 05186153 A | * | 7/1993 |
| JP | H05186153 A | | 7/1993 |
| JP | H05319725 A | | 12/1993 |
| WO | WO-2010018298 A1 | | 2/2010 |

OTHER PUBLICATIONS

International Search Report PCT/ISA/210 for International Application No. PCT/FI2013/050370 Dated Jul. 10, 2013.
Written Opinion of the International Searching Authority PCT/ISA/237 for International Application No. PCT/FI2013/050370 Dated Jul. 10, 2013.

* cited by examiner

TESTING APPARATUS AND SAFETY ARRANGEMENT

This application is a continuation of PCT International Application No. PCT/FI2013/050370 which has an International filing date of Apr. 5, 2013, and which claims priority to Finnish patent application number 20125430 filed Apr. 20, 2012, the entire contents of both which are incorporated herein by reference.

FIELD OF THE INVENTION

The invention relates to conveying systems intended for conveying passengers and a load, such as to elevator systems, and more particularly to the safety systems to be used in these.

BACKGROUND OF THE INVENTION

Especially in conveying systems operating with automatic control, such as in elevator systems, there must be a safety system according to safety regulations, by the aid of which safety system the operation of the conveying system can be stopped e.g. as a consequence of a defect or of an operating error. The aforementioned safety system comprises safety switches, which measure the safety of the system. When detecting that the safety of the conveying system has been endangered, the operation of the conveying system is interrupted and the conveying system is brought into a safe state by controlling the safety system.

Elevator regulations require that an elevator comprises safety switches, which are configured to measure functions that are critical from the viewpoint of the safety of the elevator system. Consequently, the elevator must comprise an extreme limit switch, which limits the extreme limit of the permitted movement of the elevator car in the elevator hoistway. A safety arrangement of an elevator also comprises an end buffer, the task of which is to damp the impact caused by collision of the elevator car with the end of the elevator hoistway. The extreme limit switch changes its state when the elevator car arrives at the extreme limit for permitted movement of the elevator car, said extreme limit being monitored by the extreme limit switch. The safety regulations require that the elevator car is stopped when the elevator car arrives at the extreme limit switch. The safety regulations also require that the end buffer stops movement of the elevator car before collision with the end of the elevator hoistway.

An extreme limit switch is conventionally implemented with a limit switch installed on the roof of the elevator car, which limit switch fulfills the requirements of a safety contact. Metal ramps are installed in the top end and in the bottom end of the elevator hoistway. When the elevator car passes an end floor, the ramp pushes the lever arm of the extreme limit switch, which then rotates and opens the contacts of the extreme limit switch.

It is important to ensure that the elevator cannot be taken into use without functioning and testable safety devices that comply with the regulations. However, testing of an extreme limit switch, i.e. manual measurement of the operating point of the extreme limit switch as well as of the air gap of the opened contact, is awkward. The elevator cannot from the elevator hoistway be driven with the service drive apparatus to the extreme limit switch, because according to the regulations the elevator must be stopped and remain jammed when it reaches the extreme limit switch on service drive. For this reason, conventionally it has been endeavored to position the elevator at the point of the extreme limit switch for testing by driving the elevator manually with the emergency drive apparatus from outside the elevator hoistway. Manual positioning of the elevator at the extreme limit switch by the aid of the emergency drive apparatus is, however, difficult because, firstly, the serviceman driving the elevator does not have direct visual contact into the elevator hoistway and, secondly, the stopping area at the point of the extreme limit switch is quite narrow and finding the correct stopping point generally requires several attempts.

If the operating point of the extreme limit switch comes too close to the terminal floor, the elevator car might remain jammed when it arrives at the terminal floor, in which case operation of the elevator ceases in accordance with the safety regulations and the return of the elevator to normal operation requires a serviceman to pay a visit to the site of the elevator and perform the necessary procedures.

If the operating point of the extreme limit switch comes too far from the terminal floor, the extreme limit switch does not necessarily function after the elevator rope has stretched slightly. In this case the counterweight might collide with the end buffer before the extreme limit switch stops the elevator.

Consequently there is a need to develop the testing of the operation of safety devices, such as of extreme limit switches.

AIM OF THE INVENTION

The aim of the invention is to resolve one or more of the drawbacks disclosed above. To achieve this aim the invention discloses testing apparatus according to claim 1 for testing the operation of a safety switch, testing apparatus according to claim 9 for testing the operation of a mechanical safety switch of an elevator system, and also a safety arrangement according to claim 12. The preferred embodiments of the invention are described in the dependent claims. Some inventive embodiments and inventive combinations of the various embodiments are also presented in the descriptive section and in the drawings of the present application.

SUMMARY OF THE INVENTION

The invention relates to a testing apparatus for testing the operation of an extreme limit switch in a conveying system, which can be removed from service on the basis of a signal to be received from the extreme limit switch. The testing apparatus comprises a microprocessor and a memory, in which is recorded a testing program to be run with the microprocessor. The testing program comprises instructions for preventing removal of the conveying system from service occurring on the basis of a signal from an extreme limit switch as well as for testing the operation of the extreme limit switch when removal of the conveying system from service has been prevented. The testing apparatus is configured to itself perform a testing task specified in the testing program after the start command for testing has been supplied to the testing apparatus. The conveying system is removed from service by preventing use of the conveying system. In a preferred embodiment of the invention, when making a decision about use of a conveying system, information about the removal from service is recorded in the non-volatile memory of the control of the conveying system, after which use of the conveying system is prevented on the basis of the aforementioned information recorded in the non-volatile memory. In some embodiments returning of the conveying system back into service requires that the aforementioned information about removal from service recorded in non-volatile memory is acknowledged from a manual user interface. In the case of an elevator system, removal from service means that both normal drive and service drive of the elevator with a manual user interface disposed in the elevator hoistway are prevented.

The testing apparatus according to the invention is consequently an automat, which itself performs a testing task specified in the software of the testing apparatus after the start command for testing, e.g. in the form of a starting signal, has been supplied to the testing apparatus.

In a preferred embodiment of the invention the testing program comprises instructions for requesting a starting signal and for starting testing on the basis of the starting signal received.

In a preferred embodiment of the invention the specification of the correct operation of an extreme limit switch is recorded in the memory of the testing apparatus, and the testing program in the testing apparatus comprises instructions for removing the conveying system from service if the testing indicates that the extreme limit switch does not operate correctly.

In a preferred embodiment of the invention the testing apparatus is connected to a separate return apparatus and the testing program comprises instructions for returning the conveying system back into service on the basis of a return signal received from the return apparatus.

Removal of the conveying system from service means shifting the conveying system into an operating state in which normal drive of the conveying system is in future prevented. In an elevator system this operating state means a state in which the next start of the elevator from the elevator hoistway on normal drive as well as on service drive is always prevented, in which case it is no longer possible to drive with an elevator removed from service other than emergency drive with a special manual user interface disposed in a sufficiently safe space, e.g. outside the elevator hoistway. Removal from service can be effected e.g. by recording information about the removal from service in the non-volatile memory of the system and by preventing operation of the electric drive of the conveying system on the basis of the aforementioned information recorded in memory. In this context it must be noted that e.g. just stopping the elevator car by activating a machinery brake does not necessarily mean removal of the elevator from service, if the next start of the elevator on automatic drive is still permitted and use of the elevator can consequently continue normally.

In a preferred embodiment of the invention the extreme limit switch is implemented as a safety circuit comprising an element forming a signal of a safety switch, which comprises a sensor, which measures the presence of an actuator, separate from the element forming a signal of the safety switch, in the proximity of the sensor at a reading distance from the sensor (i.e. at the operating point of the extreme limit switch). The sensor belonging to the element forming the signal as well as the actuator that is separate from the element forming the signal are in this case selected in such a way that with the sensor the, preferably wireless, signal to be received from the actuator can be read in a situation in which the element forming the signal and the actuator are situated within range of a wireless connection between them. This type of sensor can be e.g. a Hall sensor, which measures the magnetic field produced by a permanent magnet functioning as an actuator. On the other hand, the element forming a signal can also comprise an antenna, with which an electromagnetic signal produced by the actuator/ being formed with the actuator is measured, said signal giving additional information about the extreme limit switch, e.g. about the location of the extreme limit switch in the elevator hoistway.

The invention enables automatic testing of an extreme limit switch. With the testing it can be verified that the operating point (location) of an extreme limit switch is correct, that the distance between the actuator and the element forming the signal of the extreme limit switch at the operating point of the extreme limit switch is correct and that the extreme limit switch therefore functions reliably. Automatic testing can also be performed regularly without a serviceman needing to visit the elevator to test the operation of the extreme limit switch/switches manually.

In one preferred embodiment of the invention the testing program comprises instructions for bringing the element forming the signal of the extreme limit switch into an area within range of a wireless connection between an actuator and the element forming the signal of the extreme limit switch for testing the extreme limit switch.

In one preferred embodiment of the invention the testing program comprises instructions for forming a testing signal with the element forming the signal of the extreme limit switch by controlling the element forming the signal of the extreme limit switch with an actuator.

In one preferred embodiment of the invention the operation of a mechanical extreme limit switch is tested by forming a testing signal with a separate auxiliary contact of the extreme limit switch, which auxiliary contact functions when the extreme limit switch functions. Removal of the conveying system from service can in this case be prevented by short-circuiting the main contacts of the extreme limit switch, and the operation of the extreme limit switch can be tested by the aid of a testing signal to be received from the auxiliary contact.

In one preferred embodiment of the invention the testing program of the testing apparatus comprises instructions for testing the operation of an extreme limit switch by measuring the distance between the actuator of the extreme limit switch and the element forming the signal of the extreme limit switch, when the extreme limit switch has been displaced into an area within range of a wireless connection between the element forming the signal of the extreme limit switch and the actuator.

In one preferred embodiment of the invention the testing program comprises instructions for displacing the element forming the signal of the extreme limit switch from the specified reference point to the operating point of an extreme limit switch in connection with the actuator, for measuring the distance traveled from the reference point of the element forming the signal to the operating point of the extreme limit switch in connection with the actuator, and for removing the conveying system from service if the aforementioned measured distance differs from what is specified according to correct operation of the extreme limit switch. This type of testing to be performed by automatic control enables the operating point of an extreme limit switch to be measured more reliably and more accurately than is known in the art.

In one preferred embodiment of the invention the testing program comprises instructions for driving the elevator car situated at a reference point in the elevator hoistway, most preferably in a door zone, to the operating point of an extreme limit switch, for measuring the distance traveled by the elevator car from the reference point to the operating point of the extreme limit switch, and for removing the conveying system from service if the aforementioned measured distance differs from what is specified according to correct operation of the extreme limit switch.

The invention also relates to testing apparatus for testing the operation of a mechanical safety device in an elevator system, which can be removed from service on the basis of a signal to be received from an extreme limit switch, and in which elevator system a mechanical safety device is configured to operate closer to the end of the elevator hoistway than the extreme limit switch, and which testing apparatus comprises a microprocessor and a memory, in which is recorded a testing program to be run with the microprocessor, which testing program comprises instructions for preventing removal of the elevator system from service occurring on the basis of the signal of an extreme limit switch as well as for testing the operation of a mechanical safety device when removal of the elevator system from service has been prevented. The testing apparatus is configured to itself perform a testing task specified in the testing program after the start command for testing has been supplied to the testing apparatus.

In a preferred embodiment of the invention the specification of the correct operation of a mechanical safety device is recorded in the memory of the testing apparatus, and the testing program in the testing apparatus comprises instructions for removing the elevator system from service if the testing indicates that the mechanical safety device does not operate correctly.

In one preferred embodiment of the invention in a conveying system, in which an element forming the signal of the extreme limit switch is fitted in connection with the elevator car for moving along with the elevator car, the testing program in the testing apparatus comprises instructions for displacing the element forming the signal of the extreme limit switch from the specified reference point by driving the elevator car in such a way that the element forming the signal/the elevator car travels to the operating point of a mechanical safety device, for measuring the distance traveled from the reference point of the element forming the signal to the operating point of the mechanical safety device, and for removing the elevator system from service if the aforementioned measured distance differs from what is specified according to correct operation of the mechanical safety device. This type of testing to be performed by automatic control enables the operating point of a mechanical safety device to be measured more reliably and more accurately than is known in the art.

The safety arrangement according to the invention comprises an operation prevention apparatus, which operation prevention apparatus comprises an extreme limit switch as well as a supervision circuit, which is configured to remove the conveying system from service on the basis of a signal to be received from the extreme limit switch. The safety arrangement also comprises a testing apparatus according to the invention for testing the operation of an extreme limit switch. The testing apparatus is connected to the apparatus for preventing use, for preventing removal of the conveying system from service.

The supervision circuit can be implemented as a special microprocessor-controlled supervision unit, or it can also be integrated into an elevator control unit. On the other hand, the supervision circuit can be implemented also e.g. as relay logic. At least some of the testing apparatus can belong to the supervision circuit and/or to an elevator control unit and/or it can be disposed in connection with an extreme limit switch.

An elevator system can comprise a separate safety switch, which functions when the elevator car hits a mechanical safety device. In this case the operating point of the mechanical safety device can be tested on the basis of a signal of the aforementioned safety switch. In one preferred embodiment of the invention the testing program of the testing apparatus comprises instructions for testing the operation of a mechanical safety device by driving the elevator car and/or the counterweight at low speed towards the mechanical safety device and by measuring from the parameters (preferably from the current or from the torque reference) of the electric drive the point at which the force of the mechanical safety device resisting movement of the elevator car/counterweight increases and thereby the torque required of the electric drive increases in steps.

The testing apparatus can also comprise a number of microprocessors configured so that each of the microprocessors is configured to perform a certain part/subtask of the testing task specified in the testing program.

The invention enables automatic testing of a mechanical safety device of an elevator system. With the testing it is verified that the operating point (location in relation to the elevator car and/or to the counterweight) of the mechanical safety device is correct. Automatic testing can also be performed regularly without a serviceman needing to visit the elevator to test the operation of the mechanical safety device manually.

According to the invention, in addition to or instead of an end buffer disposed on a collision course with the elevator car/counterweight, e.g. an activatable mechanical detent fitted e.g. on the elevator car or in the elevator hoistway can be used as the mechanical safety device to be tested, which detent in its operating position is configured to collide with a counterpart to be disposed in the elevator hoistway or in connection with the elevator car.

In one preferred embodiment of the invention the safety arrangement comprises a manual user interface for giving a start signal for testing. In one preferred embodiment of the invention the safety arrangement comprises a communication link for giving a starting signal by remote control e.g. from a service center for elevators.

The invention also relates to a safety arrangement, which comprises an operation prevention apparatus, which operation prevention apparatus comprises an extreme limit switch as well as a supervision circuit, which is configured to remove the conveying system from service on the basis of a signal to be received from the extreme limit switch. The safety arrangement also comprises a testing apparatus according to the invention for testing the operation of an extreme limit switch as well as a mechanical safety device of an elevator system, which safety device is configured to operate closer to the end of the elevator hoistway than the extreme limit switch. The testing apparatus is connected to the apparatus for preventing use, for preventing removal of the conveying system from service.

In one preferred embodiment of the invention the testing program of the testing apparatus comprises instructions for testing an extreme limit switch and a mechanical safety device of an elevator system during the same run with the elevator by measuring both the operating point of the extreme limit switch, the operating point of a safety switch belonging to the mechanical safety device and also the point at which the force of the mechanical safety device resisting movement of the elevator car increases. In one preferred embodiment of the invention the testing program comprises instructions for sending information about failure of the testing to a service center and also instructions for sending the values measured in connection with the failed testing to the service center for more detailed analysis.

In the invention, a conveying system refers in its essential respects to a system, preferably an elevator system or corresponding, that operates with automatic control (i.e. without a driver) and is applicable to conveying passengers and freight, in which system safety switches of a specified Safety Integrity Level (most preferably a Safety Integrity Level of SIL 2 and/or SIL 3) are used for supervising operation of the system. The conveying system according to the invention can also be an automatic door, the door panel/door panels of which are moved preferably with an electric drive fitted into the system for this purpose, and in which extreme limits of permitted movement are set for movement of the panel, which extreme limits are supervised with an extreme limit switch/with extreme limit switches. It must be noted here that the extreme limits of permitted movement being supervised with the aforementioned extreme limit switch/extreme limit switches can also be changed; consequently e.g. the elevator system can comprise separate extreme limits/extreme limit switches for normal operation of the elevator and for servicing activities/construction-time use of the elevator. Additionally, the aforementioned extreme limits of permitted movement can also change dynamically; e.g. the extreme limits of permitted movement of a door panel of an automatic door can change when the location of a person/object on the trajectory of the door panel/door panels is detected.

In one preferred embodiment of the invention the element, forming a signal of the extreme limit switch is configured to measure the operating point of the extreme limit switch when the aforementioned element forming a signal is brought to within reading distance of the measuring piece of the operating point of the extreme limit switch being read with the element forming a signal, as well as to form a signal when the element forming a signal is brought to the operating point of the extreme limit switch. With the element forming the signal, therefore, the operating point of an extreme limit switch can be measured and also a signal of the extreme limit switch can be formed. The aforementioned, most preferably permanently-magnetized, measuring piece can be e.g. configured to determine the door zone of the elevator car in such a way that a linear position of the elevator car in the door zone can be measured with the element forming a signal. In a preferred embodiment of the invention the aforementioned measuring piece and the actuator of an extreme limit switch are disposed in such a way that the measuring area (door zone) of the measuring piece and the operating point of the extreme limit switch partially overlap each other, in which case measuring the position of the operating point of the extreme limit switch using the measuring piece is possible.

The preceding summary, as well as the additional features and additional advantages of the invention presented below, will be better understood by the aid of the following description of some embodiments, said description not limiting the scope of application of the invention.

More detailed description of preferred embodiments of the invention

EMBODIMENT 1

Figure 1:
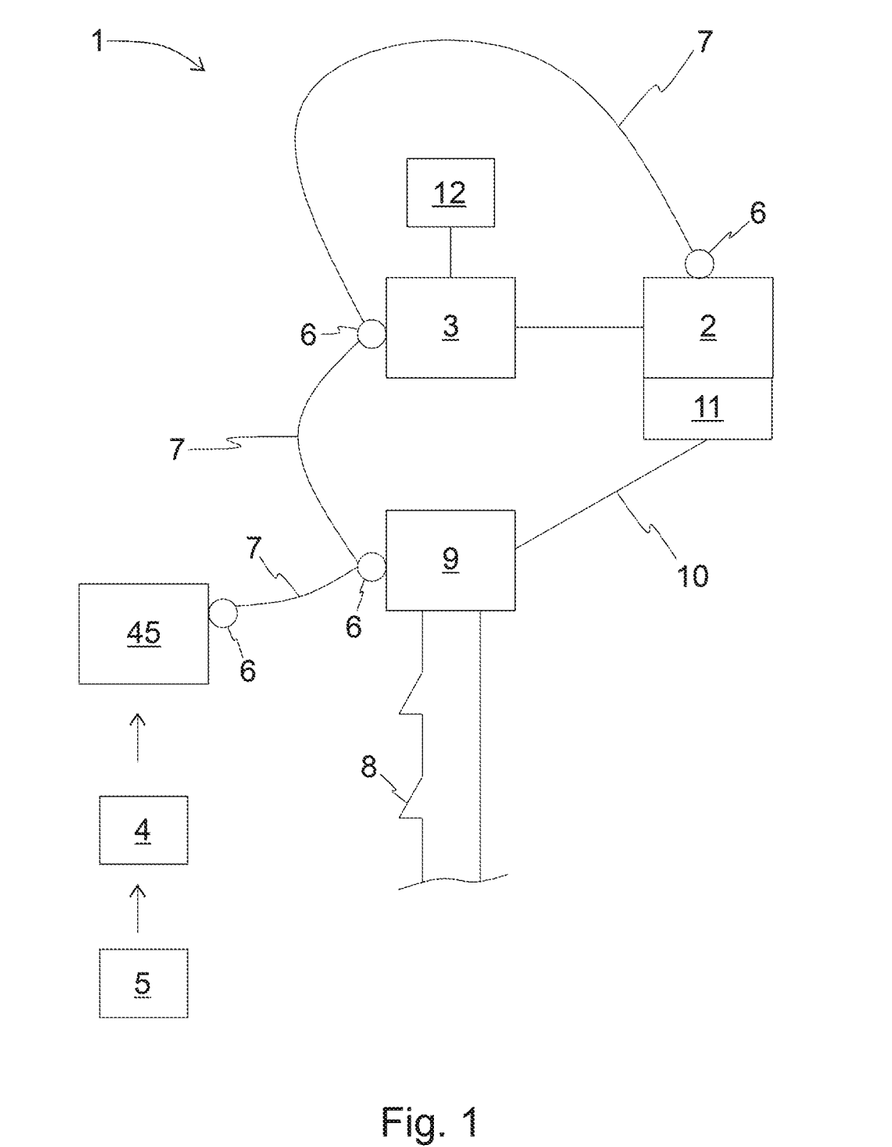
FIG. 1 presents as a block diagram one safety arrangement of an elevator according to the invention.

FIG. 1 presents a safety arrangement 1 in an elevator system, in which an elevator car (not in figure) is driven in an elevator hoistway (not in figure) with an electric drive 2 via rope friction. The speed of the elevator car is adjusted to be according to the target value for the speed of the elevator car, i.e. the speed reference, calculated by the elevator control unit 3. The speed reference is formed in such a way that the elevator car can transfer passengers from one floor to another on the basis of elevator calls given by elevator passengers. The electric drive 2 comprises a traction sheave, with which the elevator ropes and consequently the elevator car is pulled, an electric motor with which the elevator car is driven by rotating the traction sheave, one or more mechanical brakes with which the traction sheave is braked and also a frequency converter, with which the electric motor is driven by steplessly controlling the power flow between the electric motor and the supplying electricity network.

The task of the safety arrangement 1 of the elevator is to take care of the safety of elevator passengers as well as of other elevator users, such as servicemen, in variable operating conditions and operating situations. For this reason the safety arrangement 1 comprises permanently-magnetized actuators/measuring pieces 4, 5 measuring the safety of the elevator system, which are fitted beside the path of movement of the elevator car in the elevator hoistway and which are read contactlessly with a measuring device 45 moving along with the elevator car. The measuring device 45 fitted in connection with the elevator car comprises Hall sensors fitted consecutively in the direction of the path of movement of the elevator car, with which Hall sensors the aforementioned permanently-magnetized actuators/measuring pieces are read after the measuring device has reached reading distance of the actuator/measuring piece in question at that time. With the measuring device, inter alia, the measuring piece 4 of the door zone determining the location of the elevator car in the door zone is read as well as the actuator 5 (the actuator 5 of the extreme limit switch in the proximity of the top end zone and/or the bottom end zone) indicating the location of the elevator car at the extreme limit of permitted movement. A door zone of the elevator car means an area of approx. 20-30 centimeters in the vertical direction at a floor landing. The floor of an elevator car situated at the center point of a door zone is situated at exactly the same height as the floor of the floor landing, in which case elevator passengers are able to conveniently pass between the floor landing and the elevator car. The structure and operation of a measuring device 45 as well as of permanently-magnetized actuators/measuring pieces 4, 5 are described in more detail in international patent no. WO 2010/018298 A1.

The measuring device 45, as well as the elevator control unit 3, the microprocessor-controlled supervision unit 9 and the electric drive 2, are provided with a communication circuit 6, by the aid of which the devices are connected to a communications bus 7 belonging to the safety arrangement of the elevator and having a safety integration level (i.e. SIL level). The safety arrangement also comprises mechanical normally-closed safety switches 8, which are configured to supervise the position/locking of entrances to the elevator hoistway as well as e.g. the operating state of the overspeed governor of the elevator car. A change in a state being read with a measuring device 45/safety switch 8 indicates an event affecting the safety of the elevator system, such as the arrival of the elevator car in a door area or at an extreme limit switch, the opening of an entrance to the elevator hoistway, et cetera.

The measuring signal being read from a measuring piece 4 is transferred from the measuring device 45 via the communications bus 7 to the elevator control unit 3. In addition, the measuring device 45 sends to the supervision unit 9 via the communications bus 7 a signal, which indicates that the measuring device 45 has arrived at a reading distance from the actuator 5 of the extreme limit switch (i.e. indicates that the elevator car has arrived at the operating point of the extreme limit switch).

The signal of the mechanical safety switches 8, on the other hand, transfers to the supervision unit 9 in a series circuit of safety switches 8, which is wired to start and end at the aforementioned supervision unit 9. In this case the passage of the signal to the supervision unit is broken when one of the safety switches 8 opens. Breaking of the passage of the signal indicates a dangerous situation/functional nonconformance in the elevator system.

The supervision unit 9 supervises the safety of the elevator system by the aid of the aforementioned measuring arrangement. When it detects that safety is endangered, the supervision unit 9 stops and prevents driving with the elevator by forming an operation prevention signal 10; which activates the operation prevention circuit 11 of the electric drive of the elevator. The operation prevention circuit 11 is a special control circuit meeting safety regulations, which when it is activated stops and prevents use of the electric drive 2 of the elevator by controlling the machinery brakes of the hoisting machine to brake the movement of the traction sheave and also by disconnecting the control signals of the IGBT transistors of the upper branch and/or lower branch of the motor bridge of the frequency converter in such a way that the power supply from the intermediate circuit of the frequency converter towards the electric motor ceases. An operation prevention signal is preferably formed by opening the contacts of a safety relay belonging to the supervision unit 9.

The supervision unit 9 activates the operation prevention circuit 11 e.g. when it detects that the elevator car has arrived at the operating point of an extreme limit switch in connection with normal drive or service drive of the elevator. Simultaneously the software of the supervision unit 9 switches to a state preventing a run, in which case the operation prevention signal 10 keeps the operation prevention circuit 11 activated until a serviceman visits the elevator to check the situation and enters a manual command with a separate return apparatus, on the basis of which command the software of the supervision unit 9 switches from a state preventing a run back into a normal state.

For facilitating and speeding up the testing of extreme limit switches, an automatic testing process for the extreme limit switches has been added to the elevator system. The devices connected to the communications bus 7 form an automat, which itself runs the testing program specified in the software of the elevator control unit 3 in the manner presented in the following.

The testing process of the extreme limit switches is configured to be a part of the setup drive of the elevator. In the setup drive the positions of the floor levels are tabled in memory by driving the elevator car from one end of the elevator hoistway to the other and by simultaneously measuring the positions of the floor levels with door zone sensors 4.

The setup drive is started by giving a starting command with a manual user interface 12 connected to the elevator control unit 3. After this the elevator control unit 3 sends a notification to the supervision unit 9 about the starting of a setup drive, in which case the software of the supervision unit 9 switches to testing mode, in which the elevator car can be driven to the extreme limit switch without the supervision unit 9 switching to a mode preventing the run.

Figure 2A:
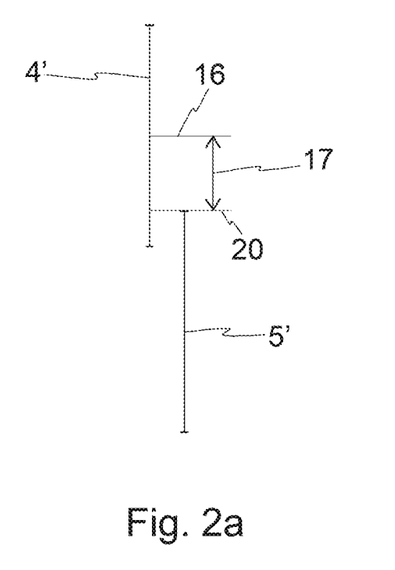
FIGS. 2a and 2b illustrate the location of the operating point in one safety arrangement of an elevator according to the invention.
Figure 2B:
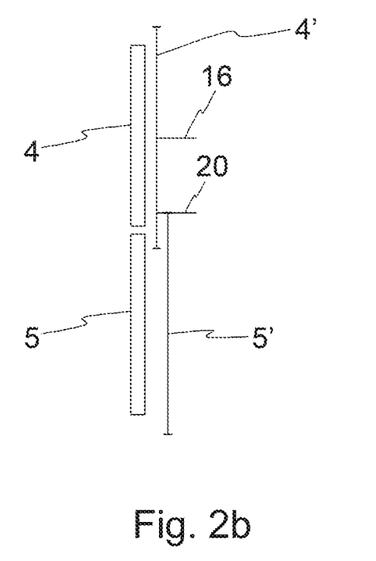
Figure 3:
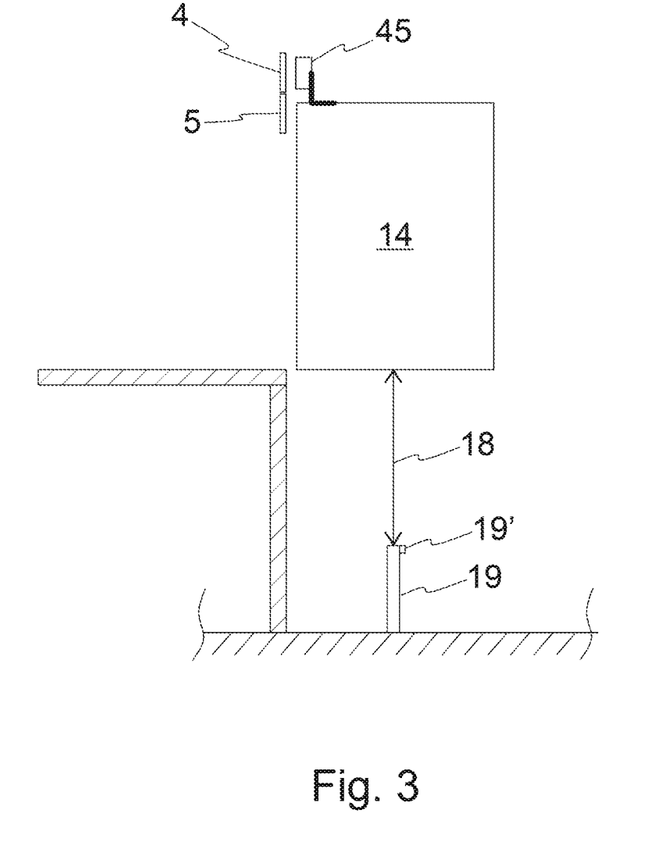
FIG. 3 presents the elevator car positioned in the door area relating to the safety arrangement of FIG. 1.

The testing arrangement for an extreme limit switch to be performed in the elevator system of FIG. 1 is illustrated in more detail in FIGS. 2a and 2b. FIG. 3 also presents the placement of a measuring device 45 and a measuring piece 4/actuator 5 in the elevator system of FIG. 1. When the elevator car 14 is situated in the door area 4', the measuring device 45 moving along with the elevator car is situated within reading distance of the measuring piece 4 (see FIG. 2b) for the door area. In this embodiment of the invention the reading distance is approx. 30 millimeters. When the elevator car is situated at the operating point 5' of the extreme limit switch, the aforementioned measuring device 45 is correspondingly situated at a reading distance from the actuator 5 of the extreme limit switch. The measuring piece 4 of the door zone and the actuator 5 of the extreme limit switch are disposed according to FIG. 2b close to each other in the direction of the path of movement of the elevator car in such a way that the door zone 4' and the operating point 5' of the extreme limit switch partially overlap each other, in which case the distance 17 that the elevator car 14/measuring device 45 travels from the reference point, preferably from the center point 16 of the door zone to the edge 20 of the operating point 5' of the extreme limit switch, can be measured with the measuring piece 4 of the door zone. The distance 17 can be e.g. 13 centimeters when using a door zone of 30 centimeters, when the actuator 5 of the extreme limit switch is correctly situated.

For testing the extreme limit switch, the elevator control unit 3 drives the elevator car 14 at creeping speed from the center point 16 of the door zone 4' to the edge 20 of the operating point 5' of the extreme limit switch, in which case the supervision unit 9 stops the elevator car by activating the operation prevention circuit 11. Alternatively the elevator car could be stopped also with the elevator control unit 3.

The elevator control unit 3 compares the distance 17 measured with the measuring device 45 to the reference value according to normal operation of the extreme limit switch, and if the measured distance 17 differs from the reference value by more than what is permitted, the elevator control unit deduces that the testing has failed and sends information about failure of the testing to the supervision unit 9. In this case the supervision unit 9 removes the elevator from service and records this information in non-volatile memory. The supervision unit 9 prevents normal drive and service drive of the elevator for as long as the information about removal of the elevator from service is recorded in the aforementioned non-volatile memory.

If the elevator control unit 3 determines that the location of the operating point of the extreme limit switch is according to normal operation, the testing process for the extreme limit switch continues by measuring the distance of the actuator 5 of the extreme limit switch situated at the operating point from the measuring device 45. Measuring of the distance takes place by measuring the strength of the magnetic field produced by the permanent magnets of the actuator 5 with the Hall sensors of the measuring device 45, because the distance between the measuring device 45 and the actuator is proportional to the strength of the magnetic field. If the distance in this case is found to differ from the normal, the elevator is removed from service in the manner described above. Otherwise the setup drive continues by driving the elevator car backwards from the operating point of the extreme limit switch and onwards to the opposite end of the elevator hoistway. Finally, the extreme limit switch disposed in the opposite end of the elevator hoistway is tested in the manner described above.

The elevator is taken into normal service only after the extreme limit switch has been proven to operate normally.

The automatic testing process for extreme limit switches can also be performed as a separate procedure to a setup run by entering the testing command from a user interface 12 or by remote control from a service center for elevators.

The testing of extreme limit switches could also be performed with the supervision unit 9, instead of the elevator control unit 3, if the supervision unit is configured for performing the testing.

EMBODIMENT 2

In this preferred embodiment of the invention an automatic testing process for testing the end buffer 19 of the elevator car has been added to the elevator system according to FIG. 1. A detail of a testing situation is presented in FIG. 3. The devices connected to the communications bus 7 in this case form an automat, which itself runs the testing program specified in the software of the elevator control unit 3 in the manner presented in the following.

The testing process for the end buffer is started by entering the testing command with a manual user interface 12 of the elevator system or by remote control from a service center for elevators. After this the elevator control unit 3 sends a notification to the supervision unit 9 about the starting of the testing process for the end buffer 19, in which case the software of the supervision unit 9 switches to testing mode, in which the elevator car can be driven past the operating point 5' of the extreme limit switch without the supervision unit 9 switching to a mode preventing the run.

In the testing process the elevator control unit 3 drives the elevator car at creeping speed from the center point 16 of the door zone 4' past the operating point 5' of the extreme limit switch and onwards towards the end buffer 19, the mechanical buffer contact 19' of which opens when the elevator car collides with the end buffer 19. The buffer contact 19' is wired to the supervision unit 9. The supervision unit 9 registers opening of the buffer contact 19' but permits continuation of the run of the elevator car. The elevator control unit 3 measures from the parameters (e.g. from the current or from the torque reference) of the electric drive 2 the point at which the force of the mechanical safety device resisting movement of the elevator car/counterweight increases, in which case the torque required of the electric drive for driving the elevator car 14 increases in steps. After this the supervision unit 9 (or alternatively the elevator control unit 3) finally stops the elevator.

The elevator control unit measures the distance 17 traveled by the elevator car 14 from the center point 16 of the door zone to the operating point 5' of the extreme limit switch, the distance 18 traveled by the elevator car 14 from the center point 16 of the door zone to the buffer contact 19' of the end buffer, and also the aforementioned point at which the force of the mechanical safety device resisting movement of the elevator car/counterweight increases. The measuring can be performed with e.g. a car encoder 25, with a wireless distance gauge or with some other measuring device that is suited to measuring the position/change in position of the elevator car 14.

The elevator control unit 3 compares the aforementioned measured distances to the reference values according to normal operation of the extreme limit switch 5/end buffer 19, and if the measured values differ from the aforementioned reference values by more than what is permitted, the elevator control unit deduces that the testing has failed and sends information about failure of the testing to the supervision unit 9, in which case the supervision unit 9 removes the elevator from service. The supervision unit 9 also records in non-volatile memory the information that the elevator has been removed from service. After this the supervision unit 9 prevents normal drive and service drive of the elevator for as long as the aforementioned information about removal of the elevator from service is recorded in non-volatile memory.

The elevator is taken into normal service only when the aforementioned testing process has been successfully performed.

The elevator control unit 3 sends information about failure of the testing, and also the values measured in connection with the failed testing, via the communications bus to a service center for more precise analysis/troubleshooting.

The testing process according to embodiment 2 could, of course, also be used for testing the operating point of the counterweight buffer (i.e. for measuring the collision point of the counterweight/counterweight buffer).

The invention is described above by the aid of a few examples of its embodiment. It is obvious to the person skilled in the art that the invention is not only limited to the embodiments described above, but that many other applications are, possible within the scope of the inventive concept defined by the claims.

The invention claimed is:

1. A testing apparatus to test operation of an extreme limit switch in a conveying system, the conveying system configured to be removed from service based on a signal from the extreme limit switch, and the testing apparatus including a microprocessor configured to execute a testing program stored on a memory, the testing program including instructions for preventing removal of the conveying system from service based on the signal from the extreme limit switch; and testing operation of the extreme limit switch when removal of the conveying system from service has been prevented; wherein the testing apparatus is configured to perform a testing task specified by the testing program after a start command for the testing has been supplied to the testing apparatus.

2. The testing apparatus according to claim 1, wherein the memory is configured to record a specification of a correct operation of the extreme limit switch; and the testing program further includes instructions for removing the conveying system from service if the testing indicates that the extreme limit switch is not operating correctly.

3. The testing apparatus according to claim 1, wherein the extreme limit switch includes a measuring device configured to generate the signal; and the testing program further includes instructions for moving the measuring device into an area within range of a wireless connection between an actuator and the measuring device, to test the extreme limit switch.

4. The testing apparatus according to claim 1, wherein the extreme limit switch includes a measuring device and an actuator; and the testing program further includes instructions for controlling the measuring device with the actuator to generate a testing signal.

5. The testing apparatus according to claim 4, wherein
the testing signal is a signal removing the conveying system from service; or
the testing signal results from a same operation of the extreme limit switch as the signal removing the conveying system from service.

6. The testing apparatus according to claim 1, wherein
the extreme limit switch includes a measuring device and an actuator; and
the testing program further includes instructions for testing the operation of the extreme limit switch by measuring a distance between the actuator and the measuring device when the extreme limit switch is in an area within range of a wireless connection between the measuring device and the actuator.

7. The testing apparatus according to claim 1, wherein
the extreme limit switch includes a measuring device and an actuator; and
the testing program further includes instructions for
displacing the measuring device from a reference point to an operating point of the extreme limit switch in connection with the actuator;
measuring a distance traveled from the reference point to the operating point of the extreme limit switch in connection with the actuator; and
removing the conveying system from service if the measured distance differs from a distance associated with correct operation of the extreme limit switch.

8. The testing apparatus according to claim 1, wherein the testing program further includes instructions for
driving an elevator car, in an elevator hoistway, from reference point to an operating point of the extreme limit switch;
measuring a distance traveled by the elevator car from the reference point to the operating point of the extreme limit switch; and
removing the conveying system from service if the measured distance differs from a distance associated with correct operation of the extreme limit switch.

9. A safety arrangement comprising:
a testing apparatus according to claim 1; and
an operation prevention apparatus including
the extreme limit switch, and
a supervision circuit configured to remove the conveying system from service based on the signal from the extreme limit switch; wherein
the testing apparatus is connected to the operation prevention apparatus for preventing removal of the conveying system from service.

10. The safety arrangement according to claim 9, wherein
the memory is configured to record a specification of a correct operation of the extreme limit switch; and
the testing program further includes instructions for removing the conveying system from service if the testing indicates that the extreme limit switch is not operating correctly.

11. The safety arrangement according to claim 9, wherein
the extreme limit switch includes a measuring device configured to generate the signal; and
the testing program further includes instructions for moving the measuring device into an area within range of a wireless connection between an actuator and the measuring device, to test the extreme limit switch.

12. The safety arrangement according to claim 9, wherein
the extreme limit switch includes a measuring device and an actuator; and
the testing program further includes instructions for controlling the measuring device with the actuator to generate a testing signal.

13. The safety arrangement according to claim 12, wherein
the testing signal is a signal removing the conveying system from service; or
the testing signal results from a same operation of the extreme limit switch as the signal removing the conveying system from service.

14. The safety arrangement according to claim 9, wherein
the extreme limit switch includes a measuring device and an actuator; and
the testing program further includes instructions for testing the operation of the extreme limit switch by measuring a distance between the actuator and the measuring device when the extreme limit switch is in an area within range of a wireless connection between the measuring device and the actuator.

15. The safety arrangement according to claim 9, wherein
the extreme limit switch includes a measuring device and an actuator; and
the testing program further includes instructions for
displacing the measuring device from a reference point to an operating point of the extreme limit switch in connection with the actuator;
measuring a distance traveled from the reference point to the operating point of the extreme limit switch in connection with the actuator; and
removing the conveying system from service if the measured distance differs from a distance associated with correct operation of the extreme limit switch.

16. The safety arrangement according to claim 9, wherein the testing program further includes instructions for
driving an elevator car, in an elevator hoistway, from a reference point to an operating point of the extreme limit switch;
measuring a distance traveled by the elevator car from the reference point to the operating point of the extreme limit switch; and
removing the conveying system from service if the measured distance differs from a distance associated with correct operation of the extreme limit switch.

17. A testing apparatus for testing operation of a mechanical safety device in an elevator system, the testing apparatus configured to be removed from service based on a signal from an extreme limit switch, the elevator system including a mechanical safety device configured to operate closer to an end of an elevator hoistway than the extreme limit switch, and the testing apparatus including a microprocessor configured to execute a testing program stored on a memory, the testing program comprising instructions for
preventing removal of the elevator system from service based on the signal from the extreme limit switch; and
testing the operation of the mechanical safety device when removal of the elevator system from service has been prevented; wherein
the testing apparatus is configured to perform a testing task specified by the testing program in response to a start command from the testing apparatus.

18. The testing apparatus according to claim 17, wherein
the memory is configured to record a specification of a correct operation of the mechanical safety device; and the testing program further includes instructions for removing the elevator system from service if the testing indicates that the mechanical safety device is not operating correctly.

19. The testing apparatus according to claim 17, wherein extreme limit switch includes a measuring device fitted in connection with an elevator car, the measuring device configured to move along with the elevator car, and to generate the signal; and the testing program further includes instructions for
- displacing the measuring device from a reference point by driving the elevator car such that the measuring device and the elevator car move to an operating point of the mechanical safety device,
- measuring a distance traveled from the reference point to the operating point of the mechanical safety device, and
- removing the elevator system from service if the measured distance differs from a distance associated with correct operation of the mechanical safety device.

20. A safety arrangement comprising:

a testing apparatus according to claim 17; and an operation prevention apparatus including
- the extreme limit switch, and
- a supervision circuit configured to remove the elevator system from service based on the signal from the extreme limit switch; wherein
- the testing apparatus is connected to the operation prevention apparatus for preventing removal of the elevator system from service.

\* \* \* \* \*